United States Patent [19]

Fox

[11] 3,956,022

[45] May 11, 1976

[54] STORAGE BATTERY WITH CARRYING DEVICE

[75] Inventor: Albert L. Fox, University Heights, Ohio

[73] Assignee: ESB Incorporated, Philadelphia, Pa.

[22] Filed: Mar. 17, 1975

[21] Appl. No.: 558,710

Related U.S. Application Data

[63] Continuation of Ser. No. 410,511, Oct. 29, 1973, abandoned.

[52] U.S. Cl. ............................................. 136/181
[51] Int. Cl.² ..................................... H01M 2/00
[58] Field of Search ................................ 136/181

[56] References Cited
UNITED STATES PATENTS

| 1,355,050 | 10/1920 | Kimball | 136/181 |
| 3,370,990 | 2/1968 | Cahal et al. | 136/181 |
| 3,710,306 | 1/1973 | McCarthy | 136/181 |

*Primary Examiner*—John H. Mack
*Assistant Examiner*—H. A. Feeley
*Attorney, Agent, or Firm*—Robert H. Robinson; Wm. Wharton Smith

[57] ABSTRACT

A storage battery with a carrying device includes a pair of flexible ears formed as a part of the battery and a removeable handle attachable thereto.

9 Claims, 8 Drawing Figures

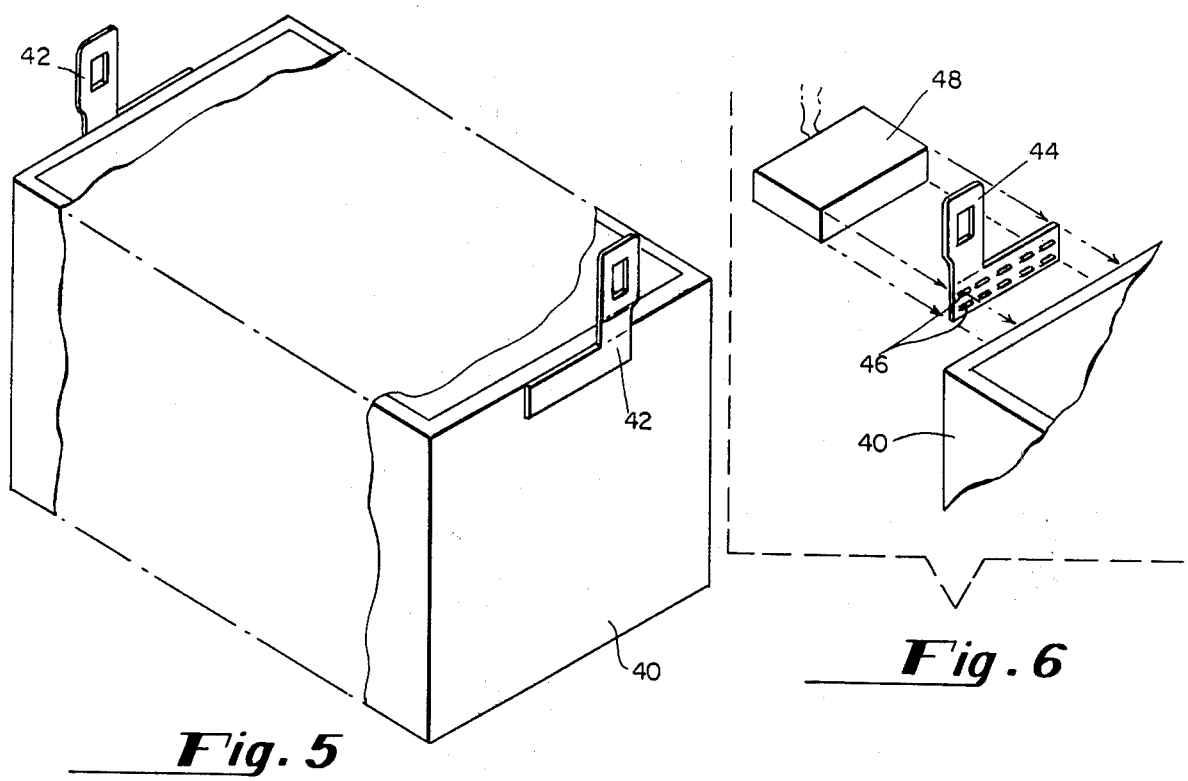
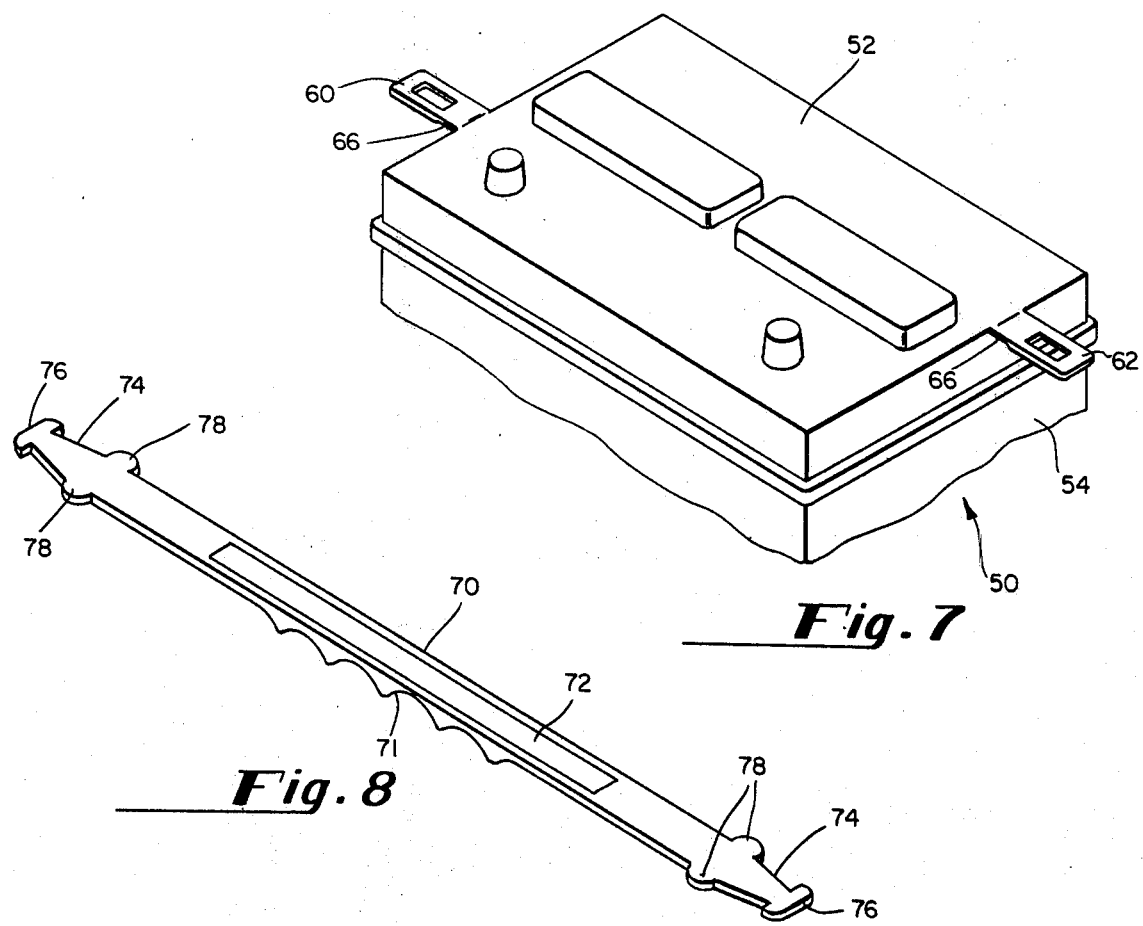

3,956,022

STORAGE BATTERY WITH CARRYING DEVICE

CROSS-REFERENCE TO RELATED PATENT APPLICATION

This application is a continuation of U.S. Pat. Application Ser. No. 410,511, filed Oct. 29, 1973, now abandoned.

BACKGROUND OF THE INVENTION

1. Field of the Invention

This invention relates to lead acid storage batteries. In particular, it relates to such batteries incorporating a carrying device.

There are classes of storage battery applications wherein the battery is used to supply electric power remote from a charging source. Examples are batteries for camping and batteries for certain smaller recreational boats. In such applications, the battery must be removed from the use location and transported to the charging location. Storage batteries are notoriously heavy and many devices have been developed to aid the user in lifting and carrying the battery from point of use to the charging area.

One class of battery handle is the fixed handle. Handles have been molded on the end of the battery container, metallic handles have been fastened to the container ends, other batteries have been located in boxes, the boxes having carrying handles. In general, handles at the ends of the battery necessitate that the battery be carried by two hands. The placement of the handles on the battery ends, in general, results in a battery having an overall dimension greater than a similar battery without end handles.

In a second form of battery handle, a single member is fastened over the top of the battery in a more or less longitudinal direction, permitting the battery to be carried in one hand. Such devices may consist of a rope with ends embedded in the battery jar or cover. Other devices comprising a strap with locking means for locking onto the battery terminals are widely used, particularly for removing and replacing automobile batteries. In general, it has been found that devices locking onto the battery posts are not always reliable, and they tend to damage the posts if used many times. Rope handles interfere with the battery top when the battery is in use. They have been known to collect acid from charging, causing discomfort to the user. Because of the widespread availability of storage batteries for the automobile trade, the dimensions of such batteries have become standards for most small battery installations. Battery compartments, battery boxes, etc., are designed to take specific sizes of automotive type batteries. This has served to prevent the introduction of special battery types having permanent handles extending above the top of the battery or fastened to the battery ends.

SUMMARY OF THE INVENTION

A storage battery is provided with a pair of lifting ears structurally formed on the battery. The ears have a pliant section so that when not in use they can fold down onto the battery cover. Means are included for removeably attaching a carrying strap to the lifting ears so as to provide a handle for transporting the battery from place to place. The lifting ears may be a part of the container molding, part of the cover molding, or they may be separate parts attached to the container or the cover by means such as ultrasonic welding.

The battery of the invention provides the customer with a simple, safe carrying means which when not in use, and because of the removeable handle, does not interfere in any way with the normal battery use or installation. The handle itself can be stored away from the top of the battery so that it does not collect acid droplets and therefore remains free from this hazard. The battery may be carried with one hand, thus freeing a user's second hand for other purposes. The carrying device does not add to the overall dimensions of the battery and thus does not result in any size penalty to the battery user. To the battery manufacturer, the battery design simplifies the manufacture of similar batteries with and without handles with the minimum of extra tooling and expense. This in turn results in an overall savings to the battery using customer, i.e., to the general public.

BRIEF DESCRIPTION OF THE DRAWINGS

FIG. 5 represents in perspective a second embodiment of a battery of the invention;

FIG. 6 illustrates in perspective a lifting ear forming a part of the battery of FIG. 5;

FIG. 7 illustrates in perspective a third embodiment of the invention; and

FIG. 8 represents a preferred carrying strap of the invention.

In FIG. 1, 10 represents a storage battery having a container 12 and covers 14. The battery comprises several cells located within the container and is provided with terminals 16a and 16b, a series of vent openings 20a, 20b, 20c one for each cell, are located along a line roughly at the middle of the battery. Vent caps 22 are provided for the vent openings. These are removeable to provide access to the interior of each cell. Within each cell, but not shown, are positive plates, negative plates, separators and electrolyte as is well known in the storage battery art. A first lifting ear 24 and a second lifting ear 26 are located at opposite ends of the battery container adjacent to the top thereof.

Figure 1:
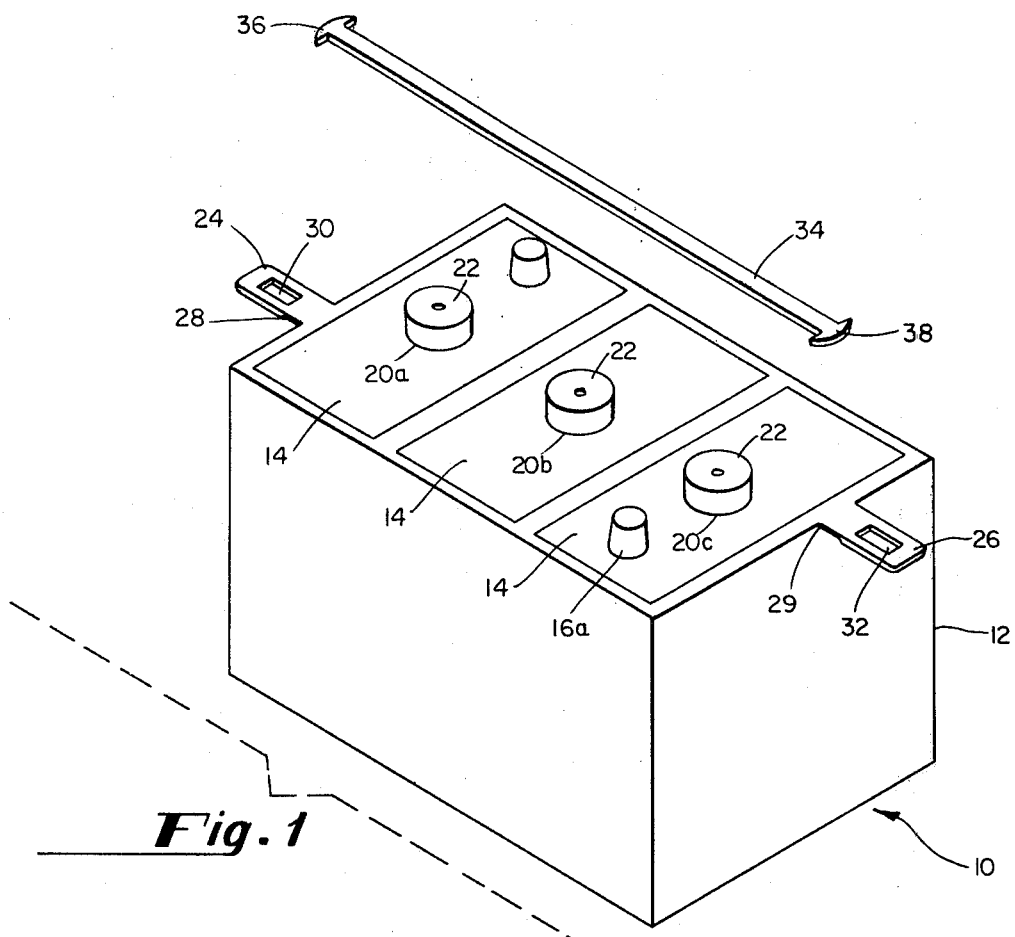
FIG. 1 represents in perspective a battery of the present invention.

A preferred material for the battery case 12 and cover 14 is polypropylene although other materials are also used for these parts. It is known in the art that when a thin section of polypropylene is flexed at the time of molding, its molecules become oriented to provide a tough pliant hinge. In the design of FIG. 1, the lifting ears 24 and 26 are shown molded integrally with the container and extending outwardly therefrom for ease of molding. A portion 28 of ear 24 near its juncture with the container 12 is made thin. The ear is flexed at the time of removal from the mold to provide a hinge. A similar thin section 29 is formed in the ear 26. Ears 24 and 26 are punctured by holes 30, 32. In the design of FIG. 1, the holes are roughly rectangular in shape. A battery carrying strap 34 is shown suspended above the battery 10. With the strap on edge, enlargements 36, 38 at either end can be pushed through the openings 30, 32. The ends are then locked to the ears by rotating the strap a part of a turn so that the combination provides a desired battery carrying means.

Figure 2:
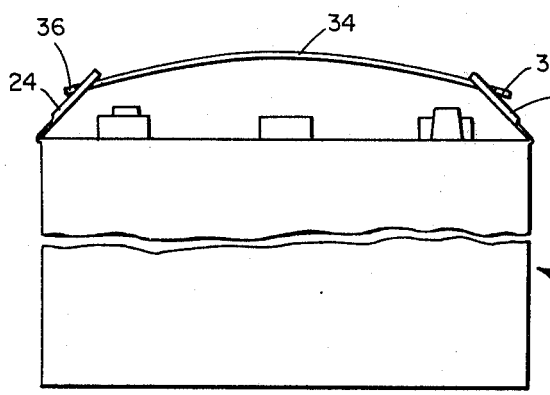
FIG. 2 represents a side view of the same battery with the carrying strap in place.

FIG. 2 shows in elevation battery 10 with handle 34 attached and in position for carrying. The pull from the handle swings the lifting ears to an elevated angle with respect to the top of the battery cover.

Figure 3:
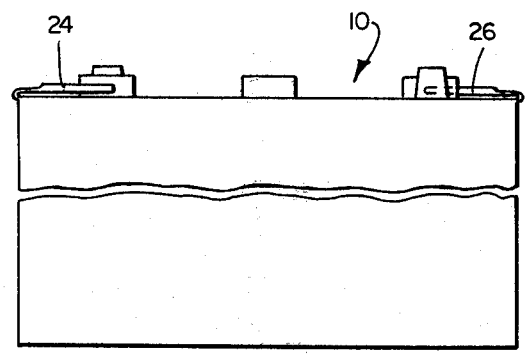
FIG. 3 represents a side view of the same battery with the carrying strap removed.
Figure 4:
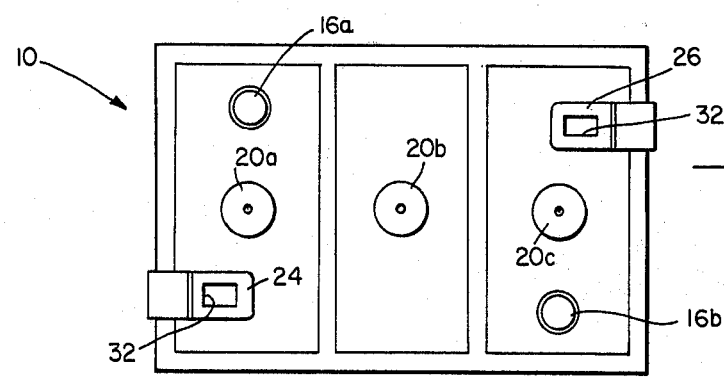
FIG. 4 represents a top view of the battery of FIG. 3.

FIG. 3 shows the same battery with handle removed and with the lifting ears 24, 26 pressed down so as to be parallel with and adjacent to the top of the battery cover. FIG. 4 shows in plan the top of the battery of FIG. 3. Ear 24 is located so that it lies on one side of vent opening 20a and the battery terminal post 16b is on the opposite side of vent opening 20a. Ear 26 is shown located close to vent opening 20c at the opposite end of the battery. The lateral location of ears 24, 26 is such that when the handle 34 is attached, the center of gravity of the battery in an upright position falls approximately under the center of the carrying strap. FIGS. 3 and 4 also serve to indicate that the ears 24, 26 when folded down do not in any way extend beyond the normal overall dimensions of the battery, thus permitting the use of the maximum size battery in any given battery compartment.

A second embodiment of the invention is shown in FIG. 5. Battery container 40 has flexible lifting ears 42 attached thereto rather than being an integral part of the battery container molding. The attachment means may include such devices as fasteners, adhesives, etc., however, because of the nature of the materials best suited for container and ear, a fastening means making use of ultrasonic welding has been found most appropriate. In this construction, the ears are formed separate from the container. A separate lifting ear 44 is shown in FIG. 6. A series of small protrusions or energy directors 46 are formed on the side of the part that will contact the container. To effect the weld the lifting ear and the container are clamped between a firm back-up piece and an ultrasonic energy transducer such as 48. The transducer is energized and the parts are unified by pressure and energy so as to complete the weld.

In choosing between the embodiment of FIG. 1 molded ears and that of FIG. 5 welded ears, it will be observed that if a production run of a given battery type is to be mostly of the carrying strap style, the design of FIG. 1 could best be used. If batteries without carrying strap are wanted, the ears can be easily cut off. On the other hand, if a production run of batteries without carrying straps is wanted with a lesser quantity of batteries with carrying straps, then the design of FIG. 5 is the better choice.

A further embodiment of the invention is illustrated in FIG. 7. In the multicell battery 50 of FIG. 7, a single cover 52 closes the several cell compartments in container 54. In the assembly of batteries using a single multicell cover, it is important that each cell is completely sealed from the remaining cells of the battery and therefore it has been found desirable to use the best possible sealing means between container and cover. Two preferred sealing means have been found, one using epoxy cements the the other making use of weld techniques. Both of these sealing means produce strong permanent bonds so that the battery can be safely carried by the cover without fear of the container and internals dropping away.

A lifting ear 60 is shown located at one end of cover 52 and a second ear 62 at the opposite end. As shown in FIG. 7, these ears 60, 62 are molded as a part of the cover 52. Flex sections 66 may be molded in the ears to act as hinges.

In an alternate to the design of FIG. 7, and similar to FIG. 5, the ears may be welded to the cover instead of being a part of the cover molding.

The carrying strap 34 in simplest form may be a piece of rope with a knot in either end. An alternative is a band cut from a flat sheet. However, for most comfort in carrying the battery, a molded carrying strap having carefully rounded edges is preferred. In the molded design of strap the top central portion can be used as a display area for instructions as well as promotional material. Such a carrying strap is shown in perspective in FIG. 8. Central handle section 70 may have finger grips 71 formed on the bottom and information area 72 molded on the top. Proximate to either end of the strap is a narrow section 74. Enlargements 76 are located at either end of the strap and serve to carry the weight of the battery when the ends of the straps are positioned in their respective holes in the lifting ears. Projections 78 prevent the strap from being pushed too far through the openings in the lifting ears. The molded lifting strap may be formed from any one of the available flexible polymeric materials known to the art such as plasticized PVC, polyethylene, rubber materials etc. However, polypropylene is preferred because of its combination of chemical inertness, flexibility and stiffness. The flexibility allows it to conform to an accurate shape and the stiffness prevents the lifting enlargements from slipping through the openings in the lifting ears.

A particular feature of the carrying device of the invention, is that when the battery is located in its use position, the handle may be removed and stored in any convenient place. Thus, the handle does not interfere with the use of the battery nor does it obstruct the vent openings. Further, the handle, when stored away from the battery, is not exposed to acid spray, etc., which may issue from the vents during normal battery operation. Thus, the user is protected against possible acid exposure when it is necessary to move the battery.

It is to be understood that the above descriptions refer to particular embodiments of the invention. Other embodiments of the invention will be readily apparent to one skilled in the storage battery art.

Having fully described by invention, I hereby claim:

1. A storage battery having a plurality of cells in a container and a cover therefor with each cell comprising positive plates, negative plates, separators between the positive and negative plates, and electrolyte, said container or cover or both the container and cover being polypropylene, said battery having 2 polypropylene lifting ears located on opposite sides of the battery, each lifting ear extending above the top of the battery with the portion above the battery having a hole therein adapted to removeably receive the end of a carrying strap, said lifting ears being located diagonally from each other so that when the carrying strap is inserted in the lifting ears the center of gravity of the battery in an upright position falls approximately under the center of the carrying strap, and both of said lifting ears being flexed at the time they are made so as to orient the molecules to provide a tough pliant hinge section which is located just above the top of the battery whereby the portion of the lifting ears extending above the top of the battery can be folded down repeatedly upon the top of the battery.

2. A storage battery as defined in claim 1 wherein the cover and the lifting ears are polypropylene and the lifting ears are integral parts of the cover formed in the same molding operation.

3. A storage battery as defined in claim 1 wherein the cover and the lifting ears are polypropylene and the lifting ears are discrete pieces which are permanently bonded to the cover.

4. A storage battery as defined in claim 3 wherein the lifting ears are permanently bonded to the cover by welding the ears to the cover.

5. A storage battery as defined in claim 1 wherein the container and the lifting ears are polypropylene and the lifting ears are integral parts of the container formed in the same molding operation.

6. A storage battery as defined in claim 1 wherein the container and the lifting ears are polypropylene and the lifting ears are discrete pieces which are permanently bonded to the container.

7. A storage battery as defined in claim 6 wherein the lifting ears are permanently bonded to the container by welding the ears to the container.

8. A storage battery as defined in claim 1 wherein a carrying strap is removeably attached to the lifting ears.

9. A storage battery as defined in claim 8 wherein the lifting ears have an elongate hole therethrough and at each end of the carrying strap there is an enlargement with a narrow section adjacent each enlargement, each narrow section being placed in the elongate hole of each receiving lifting ear and each enlargement preventing the carrying strap from being removed from the lifting ears when the battery is being carried by the carrying strap.

* * * * *